US011295430B2

(12) United States Patent
Krishnamoorthy

(10) Patent No.: US 11,295,430 B2
(45) Date of Patent: *Apr. 5, 2022

(54) IMAGE ANALYSIS ARCHITECTURE EMPLOYING LOGICAL OPERATIONS

(71) Applicant: Bank of America Corporation, Charlotte, NC (US)

(72) Inventor: Madhusudhanan Krishnamoorthy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/879,349

(22) Filed: May 20, 2020

(65) Prior Publication Data

US 2021/0366095 A1 Nov. 25, 2021

(51) Int. Cl.
*G06T 7/00* (2017.01)
*G06F 1/03* (2006.01)
(Continued)

(52) U.S. Cl.
CPC .............. *G06T 7/0002* (2013.01); *G06F 1/03* (2013.01); *G06F 9/30029* (2013.01);
(Continued)

(58) Field of Classification Search
CPC ......... G06T 7/0002; G06T 2207/10024; G06T 2207/20081; G06T 2207/20084; G06T 2207/20216; G06F 1/03; G06F 9/30029; G06F 17/18; G06F 17/16; G06K 9/6277; G06K 9/6273; G06N 3/08; G06N 20/10; G06V 10/751; G06V 10/82
See application file for complete search history.

(56) References Cited

U.S. PATENT DOCUMENTS 10,235,601 B1 3/2019 Wrenninge et al.
10,546,242 B2 1/2020 Jain et al.
(Continued)

OTHER PUBLICATIONS

Rastegari, M., et al., "XNOR-Net: ImageNet Classification Using Binary Convolutional Neural Networks," arXiv:1603.05279v4 [cs.CV]2, Aug. 2016.*
(Continued)

*Primary Examiner* — Xuemei G Chen

(57) ABSTRACT

An analysis tool receives an image as an input matrix. A first convolutional kernel is determined by performing exclusive nor operations between the input matrix and a first weight vector. A first binary kernel is determined based on the first convolutional kernel. A first layer feature map is determined by convoluting the input matrix using the first binary kernel. A second convolutional kernel is determined by performing exclusive nor operations between the first layer feature map and the second weight vector. A pooled kernel is determined based on the second convolutional kernel. A second binary kernel is determined, based on the pooled kernel. A second layer feature map is determined by convoluting the first layer feature map using the second binary kernel. A probability is determined that the input matrix is associated with a predetermined class of images. If the probability is greater than a threshold, classification results are provided.

20 Claims, 6 Drawing Sheets

(51) Int. Cl.
*G06F 9/30* (2018.01)
*G06F 17/18* (2006.01)
*G06N 20/10* (2019.01)
*G06N 3/08* (2006.01)
*G06K 9/62* (2022.01)
*G06V 10/75* (2022.01)

(52) U.S. Cl.
CPC ........... *G06F 17/18* (2013.01); *G06K 9/6277* (2013.01); *G06N 3/08* (2013.01); *G06N 20/10* (2019.01); *G06V 10/751* (2022.01); *G06T 2207/10024* (2013.01); *G06T 2207/20081* (2013.01); *G06T 2207/20084* (2013.01); *G06T 2207/20216* (2013.01)

(56) References Cited

U.S. PATENT DOCUMENTS

| | | | |
|---|---|---|---|
| 10,565,429 | B2 | 2/2020 | Chukka et al. |
| 2004/0218804 | A1 | 11/2004 | Affleck et al. |
| 2006/0224539 | A1 | 10/2006 | Zhang et al. |
| 2008/0107330 | A1 | 5/2008 | Cotman et al. |
| 2008/0235719 | A1 | 9/2008 | Sharma |
| 2009/0232378 | A1 | 9/2009 | Nakamura |
| 2010/0111396 | A1 | 5/2010 | Boucheron |
| 2012/0020573 | A1 | 1/2012 | Kacenjar |
| 2012/0121169 | A1 | 5/2012 | Cotman et al. |
| 2014/0219526 | A1 | 8/2014 | Linguraru et al. |
| 2016/0350914 | A1 | 12/2016 | Champlin et al. |
| 2017/0109571 | A1 | 4/2017 | McDuff et al. |
| 2017/0330029 | A1 | 11/2017 | Turcot et al. |
| 2018/0012082 | A1 | 1/2018 | Satazoda et al. |
| 2018/0096232 | A1 | 4/2018 | Danielsson et al. |
| 2018/0107902 | A1 | 4/2018 | Yang et al. |
| 2018/0121760 | A1 | 5/2018 | Santamaria-Pang et al. |
| 2018/0197032 | A1 | 7/2018 | Lee et al. |
| 2018/0225550 | A1* | 8/2018 | Jacobsen .................. G06N 3/04 |
| 2018/0330506 | A1 | 11/2018 | Grady et al. |
| 2018/0336674 | A1 | 11/2018 | Lim et al. |
| 2018/0373934 | A1 | 12/2018 | Bridges et al. |
| 2019/0065896 | A1* | 2/2019 | Lee ...................... G06K 9/6251 |
| 2019/0147327 | A1 | 5/2019 | Martin |
| 2019/0156151 | A1 | 5/2019 | Wrenninge et al. |
| 2019/0208097 | A1 | 7/2019 | Liu et al. |
| 2019/0213482 | A1 | 7/2019 | Socher et al. |
| 2019/0220694 | A1 | 7/2019 | Biswas et al. |
| 2019/0279293 | A1 | 9/2019 | Tang et al. |
| 2019/0286953 | A1* | 9/2019 | Farhadi .................... G06N 3/04 |
| 2019/0318485 | A1 | 10/2019 | Shichijo et al. |
| 2019/0325004 | A1 | 10/2019 | Deng et al. |
| 2019/0347522 | A1 | 11/2019 | Nir et al. |
| 2019/0385230 | A1 | 12/2019 | Tang et al. |
| 2019/0392270 | A1 | 12/2019 | Pham et al. |
| 2020/0034669 | A1 | 1/2020 | Ordonez |
| 2020/0042871 | A1 | 2/2020 | Francini et al. |
| 2020/0051241 | A1 | 2/2020 | Clark et al. |
| 2020/0054216 | A1 | 2/2020 | Cheng et al. |
| 2020/0065624 | A1 | 2/2020 | Wilczynski et al. |
| 2020/0090030 | A1 | 3/2020 | Huang et al. |
| 2020/0097818 | A1* | 3/2020 | Li ........................ G06N 3/0481 |
| 2020/0210843 | A1* | 7/2020 | Tao ........................ G06N 3/084 |
| 2020/0218964 | A1* | 7/2020 | Nakahara ................ G06N 3/08 |
| 2020/0301668 | A1* | 9/2020 | Li .......................... G11C 11/419 |
| 2020/0311523 | A1* | 10/2020 | Hoang ................... G06F 7/496 |
| 2020/0342921 | A1* | 10/2020 | Jiang ..................... G11C 11/419 |
| 2021/0073619 | A1* | 3/2021 | Wang .................. G06N 3/0454 |
| 2021/0074349 | A1* | 3/2021 | Kim ..................... G06N 3/063 |
| 2021/0110244 | A1* | 4/2021 | Hoang .................. G06N 3/063 |
| 2021/0134343 | A1* | 5/2021 | Li .......................... G11C 11/54 |
| 2021/0150218 | A1* | 5/2021 | Chen ................... G06K 9/6221 |
| 2021/0166106 | A1* | 6/2021 | Ghasemzadeh ........ G06N 3/084 |
| 2021/0174182 | A1* | 6/2021 | Greenberg ........... G06N 3/0635 |
| 2021/0192325 | A1* | 6/2021 | Hoang .................. G11C 11/54 |
| 2021/0271914 | A1* | 9/2021 | Keshwani ............. G06N 20/00 |
| 2021/0312959 | A1* | 10/2021 | Shan ........................ G11C 7/06 |

OTHER PUBLICATIONS

U.S. Appl. No. 16/879,258, filed May 20, 2020, Krishnamoorthy.

* cited by examiner

IMAGE ANALYSIS ARCHITECTURE EMPLOYING LOGICAL OPERATIONS

TECHNICAL FIELD

The present disclosure relates generally to image analysis. More particularly, in certain embodiments, the present disclosure is related to an image analysis architecture employing logical operations.

BACKGROUND

In some cases, there is a need to identify objects in images and classify images based on their content. For example, an individual or organization may desire to classify a set of images into different classes or types (e.g., images containing a person and images not containing a person) based on their content. There exists a need for improved tools for performing such image analysis.

SUMMARY

In an embodiment, a system includes a memory configured to store an input matrix. Each element of the input matrix corresponds to a value of a portion of an image. The system includes a field programmable gate array (FPGA) device. The FPGA device includes input/output interfaces communicatively coupled to the memory and a plurality of logical blocks. Each logical block is coupled to a corresponding input/output interface. The plurality of logical blocks include a first set of logical blocks. Each logical block of the first set of logical blocks includes a corresponding truth table configured to implement an exclusive nor operation between a first layer input and a first weight vector. Each of a second set of logical blocks includes a corresponding truth table configured to implement an exclusive nor operation between a second layer input and a second weight vector. A third set of logical blocks is configured to store the first weight vector for the first layer of the neural network model and the second weight vector for the second layer of the neural network model. The FPGA device receives, from the memory, the input matrix. At least a portion of the input matrix and the first weight vector are provided to the first set of logical blocks. A first convolutional kernel is determined, using at least a portion of the first set of logical blocks, by performing the exclusive nor operations, implemented by the truth tables of the first set of logical blocks, between the input matrix and the first weight vector. A first binary kernel is determined, using at least a portion of the first set of logical blocks, based on the first convolutional kernel. The first binary kernel includes a matrix of the same size as the first convolutional kernel with values adjusted to conform to a normal distribution. A first layer feature map is determined, using at least a portion of the first set of logical blocks, by convoluting the input matrix using the first binary kernel. The first layer feature map and the second weight vector are provided to the second set of logical blocks. A second convolutional kernel is determined, using at least a portion of the second set of logical blocks, by performing the exclusive nor operations, implemented by the truth tables of the second set of logical blocks, between the first feature map and the second weight vector. A pooled kernel is determined, using at least a portion of the second set of logical blocks, based on the second convolutional kernel. The pooled kernel includes, for each element of the pooled kernel, a representative value associated with a corresponding pooling region of the second convolutional kernel. A second binary kernel is determined, using at least a portion of the second set of logical blocks, based on the pooled kernel. The second binary kernel includes a matrix of the same size as the pooled kernel with values adjusted to conform to the normal distribution. A second layer feature map is determined, using at least a portion of the second set of logical blocks, by convoluting the first layer feature map using the second binary kernel. A probability is determined, based at least in part on the second layer feature map, that the input matrix is associated with a predetermined class of images. In response to determining that the probability is greater than a threshold value, the FPGA device provides classification results indicating the image is associated with the class of images.

In another embodiment, a system includes an image source configured to store an image and provide access to the image via a network. An analysis tool stores a first weight vector configured to determine a first convolutional kernel based on a first layer input, a second weight vector configured to determine a second convolutional kernel based on a second layer input, and look-up tables. Each look-up table includes information for implementing exclusive nor operations between two inputs. The analysis tool receives, via the network, the image as an input matrix, where each element of the input matrix corresponds to a value of a portion of the image. The first convolutional kernel is determined by performing exclusive nor operations, implemented using at least a portion of the look-up tables, between the input matrix and the first weight vector. A first binary kernel is determined, based on the first convolutional kernel. The first binary kernel includes a matrix of the same size as the first convolutional kernel with values adjusted to conform to a normal distribution. A first layer feature map is determined by convoluting the input matrix using the first binary kernel. A second convolutional kernel is determined by performing exclusive nor operations, implemented using at least a portion of the look-up tables, between the first layer feature map and the second weight vector. A pooled kernel is determined, based on the second convolutional kernel. The pooled kernel includes, for each element of the pooled kernel, a representative value associated with a corresponding pooling region of the second convolutional kernel. A second binary kernel is determined, based on the pooled kernel. The second binary kernel includes a matrix of the same size as the pooled kernel with values adjusted to conform to the normal distribution. A second layer feature map is determined by convoluting the first layer feature map using the second binary kernel. A probability is determined, based at least in part on the second layer feature map, that the input matrix is associated with a predetermined class of images. In response to determining that the probability is greater than a threshold value, classification results are provided to a classification repository, the classification results indicating the image is associated with the class of images. The classification repository is configured to receive and store the classification results.

Previous image analysis approaches have limited effectiveness for complex analysis tasks such as the recognition of objects in images and/or the classification of images. One approach to improving image analysis is using a neural network, such a convolutional neural network (CNN). This disclosure encompasses the recognition of previously unidentified problems associated with previous technology used to implement (e.g., or "accelerate") such neural networks. For instance, previous approaches to implementing neural networks rely on processing architectures which are either slow and inaccurate (e.g., central processing units (CPUs)) or have high operating cost due to increased memory consumption and heat generation (e.g., graphical processing units (GPUs)). For instance, although CNNs implemented using GPUs tend to be faster and more accurate than those implemented using CPUs, GPUs consume significantly more memory and have increased cooling requirements. These increased cooling demands cannot practically be met, resulting in a significant limitation to the extent to which CNN-based image analysis can be implemented in practice. CNNs implemented using GPUs also have large memory requirements. For instance, a CNN implemented using a set of GPUs may consume ten times or more memory than a similar CNN implemented using a set of CPUs. Accordingly, prior to this disclosure, there was a tradeoff between performance and efficiency when selecting between more accurate GPU-implemented CNNs and more memory- and resource-efficient but less accurate CPU-implemented CNNs.

Certain embodiments of this disclosure provide unique solutions to the newly recognized technical problems described above and other technical problems by facilitating the more reliable and efficient implementation of a neural network, for example, to perform image analysis. The disclosed systems, methods, devices, and architectures provide several technical advantages which include 1) more accurate implementation of neural network calculations with a similar training time and significantly decreased memory usage compared to previous technologies; 2); the use of more computationally efficient logical operations in place of more computationally complex matrix operations in neural networks; and 3) an improved ability to scale up neural network-based decision making using the specially configured field programmable gate array (FPGA) devices described herein. As such, the systems described in this disclosure may improve the function of computer systems used to implement neural networks (e.g., for image and/or text analysis). The systems may also or alternatively reduce or eliminate practical and technical barriers to scaling the use of neural networks without exceeding memory, power, and/or cooling limitations. The systems described in this disclosure may particularly be integrated into a practical application for implementing CNNs for image classification using an FPGA-based device which is at least as accurate as previous GPU-based CNNs and significantly more efficient in terms or memory consumption. Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to this disclosure, there was a lack of tools for both reliably and efficiently analyzing images and/or documents, for example, to perform object detection or image classification. Previous approaches to image classification rely on GPU-implemented methods involving repeated matrix operations (e.g., matrix multiplication) and high memory and power requirements. In many cases, the inefficiency of previous approaches (e.g., in terms of memory and power utilization) is a bottleneck to practical implementation of neural networks to classify large sets of images, videos, and/or documents. Various embodiments of this disclosure may solve these and/or other technical problems associated with previous technologies. For instance, in certain embodiments, this disclosure facilitates the efficient classification of images and/or documents. For example, both improved accuracy and efficiency may be achieved using the new FPGA device described in this disclosure (e.g., as described with respect to TABLE 1 and FIGS. 2A-4 below). In some embodiments, relatively computationally costly and complex matrix operations used to implement neural networks may be performed using more efficient logical operations (e.g., as described with respect to FIG. 5 below).

Certain embodiments of the systems, devices, and methods described in this disclosure may facilitate improved implementation of a convolutional neural network (CNN). A CNN is a trained neural network model which allows high-level features to be extracted from input images. A CNN model may include convolutional, pooling, and fully connected layers. The first or lower-level layers of the model may capture regional information about an image (e.g., associated with the detection of edges and/or curves), and the higher-level layers may interpret these lower-level features into higher-level features or abstractions (e.g., the presence of a person, an arm, handwriting, etc. in an image). Each layer of the CNN may have a corresponding kernel, which may function, for example, as a filter, for identifying features in the input from a previous layer. The output of a CNN generally includes at least one probability that the original input image is associated with a predetermined class. For example, a probability may be assigned to the image indicating a likelihood that the image includes certain content (e.g., a probability that the image contains a human, a probability the image contains a dog, a probability the image includes handwritten text, etc.).

Image Classification System

Figure 1:
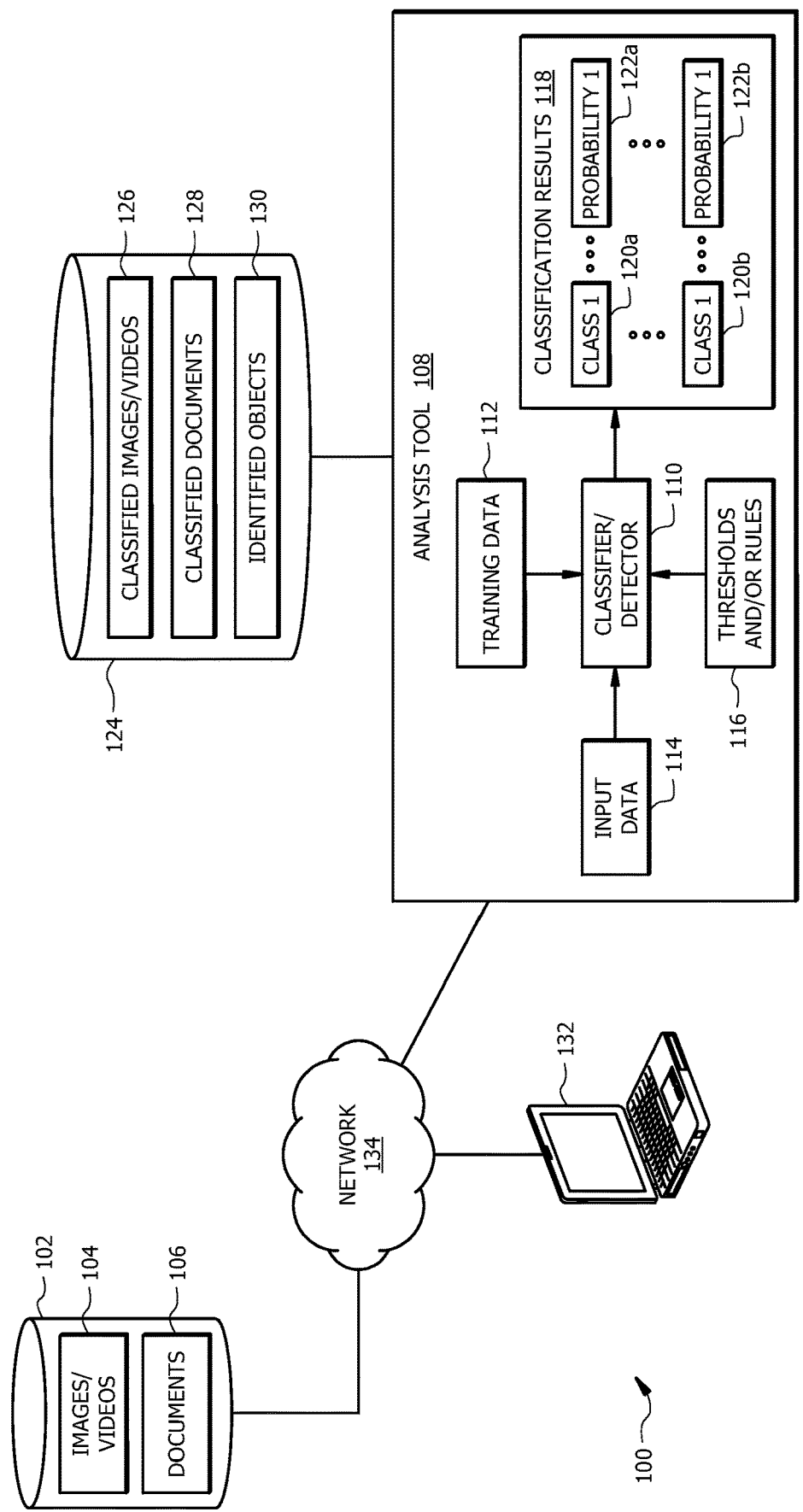
FIG. 1 is a schematic diagram of an example system for implementing an image and/or document analysis tool, according to an illustrative embodiment of this disclosure.

FIG. 1 is a schematic diagram of an example system 100 for implementing an analysis tool 108. The system 100 includes one or more data sources 102, the analysis tool 108, classification repository 124, a user device 132, and a network 134. As described further below, the analysis tool 108 of system 100 is generally configured to receive image/video files 104 and/or documents 106 from a data source 102 and use this input data 114 to generate classification results 118. These results 118 may include one or more of classified images/videos 124, classified documents 128, and/or detected objects 130, which may be stored in the classification repository 124 and/or provided for display to a user via user device 132. Further examples of the hardware and implementation of the analysis tool 108 are described below with respect to FIGS. 2A-6. For example, the analysis tool 108 may include a specially configured field programmable gate array (FPGA), as described with respect to FIGS. 2A-4. In some embodiments, the analysis tool 108 employs a process to characterize input data 114 (e.g., whether image/video data 104 or document data 106) using efficient logical operations in place of more computationally complex and expensive matrix operations (e.g., matrix multiplication).

The one or more data sources 102 are generally sources (e.g., data repositories, computing devices, etc.) operable to store information which may be classified using the analysis tool 108. For instance, a data source 102 may store image and/or video data 104. Such image/video data 104 may include one or more image files and/or video files. An image file include a matrix of values where each value in the matrix corresponds to a pixel in the image. A color image (e.g., an RGB image) may include for each matrix entry corresponding to a pixel position in the image, a red color value (R value), a green color value (G value), and a blue color value (B value). Color images may use any appropriate color code (e.g., RGB color code, a HEX color code, HSL color code). Images may be grayscale (e.g., containing a matrix of gray values). A video file may include a collection of similar image matrices, where each matrix corresponds to a time point, or frame, in the image. Documents 106 may include a collection of alphanumeric text. In some cases, documents 106 may be images containing such texts (e.g., whether typed, handwritten, or both). Data source(s) 102 are operable to receive, store, and/or transmit the image/video data 104 and document data 106. As an example, the data source(s) 102 may be configured to provide, via the network 134, the image/video data 104 and document data 106 for display using the analysis tool 108 and user device 132. For instance, a website hosted on the network 134 may facilitate viewing of the image/video data 104 and document data 106 stored in the data source(s) 102. It should be understood that system 100 may include anywhere from one to hundreds, thousands, or more data sources 102. Each of the one or more data sources 102 may be implemented using the processor, memory, and interface of device 600 described with respect to FIG. 6 below.

The analysis tool 108 may be any computing device, or collection of computing devices, configured to receive input data 114 (e.g., via the network 134). The input data 114 may include or be based on image/video data 104 and/or document data 105 from the source(s) 102. The analysis tool 108 includes a detector/classifier 110 which is configured to determine classification results 118 for input data 114. For input data 114 which includes image/video data 104, the analysis tool 108 may convert color image/video data 104 to an appropriate format for analysis. For instance, an RGB image includes an N×N×3 matrix of values where N corresponds to the number of pixels along each spatial dimension (e.g., the x and y dimensions) of the image 104. The analysis tool 108 may convert this N×N×3 matrix to an N×N matrix. For example, a color image may be converted to a grayscale image. May involve averaging the three RGB values of an RGB input image. If an input image is another color format, any appropriate approach may be used to convert the color image to a two-dimensional (e.g., N×N) matrix representation of the image 104. Similarly, input data 114 which includes a document 106 may be preprocessed to facilitate improved analysis (e.g., to make text more readable, to remove words known not to aid in classification, etc.). The classification results 118 may include classified images/videos 126, classified documents 128, and/or detected objects 130. This information may be stored in the classification repository 124, described further below. The classified images/videos 126 may include images/videos 104, which have been classified by the analysis tool 108, along with the corresponding classification results 118. For example, a classified image/video 126 may include all or portions of a corresponding image/video 104 along with at least one probability 122*a,b* that the image/video 104 is associated with a given class 120*a,b* (e.g., that the image contains a human, handwritten text, etc.). The classified documents 128 may include documents 106 which have been classified by the analysis tool 108. For example, a classified document 128 may include all or a portion of a given document 106 along with at least one probability 122*a,b* that the document 106 is associated with a given class 120*a,b* (e.g., that the document is associated with a given business unit, that the document describes an event which should be flagged for further administrative review, etc.).

The classifier/detector 110 may be "trained" using training data 112. In some embodiments, the classifier/detector 110 employs a convolutional neural network (CNN) for image and/or video 104 classification. In some embodiments, the classifier/detector 110 employs a recurrent neural network (RNN) for document 106 classification. The training data 112 may include previously reviewed images/videos 104 and/or documents 106 with known classifications and/or with known objects identified in the images/videos 104. In some embodiments, at least the classifier/detector 110 portion of the analysis tool 108 is implemented using a specially configured FPGA device (e.g., one or more of the example FPGAs illustrated in FIG. 2A and described with respect to FIGS. 2A-4 below). In such embodiments, the training data 112 may be used, for example to adjust and/or update the weights (e.g., weights 306, 314, 324 of FIG. 3), which aid in identifying features in images/videos 104 and/or documents 106 and associating these features with predefined classifications and/or objects. In some embodiments, the analysis tool 108 may be implemented using the processor, memory, and interface of device 600 described with respect to FIG. 6 below. In some embodiments, the analysis tool 108 may be implemented on the user device 132 (e.g., using appropriate instructions stored in a memory of the device 132 and executed by a processor of the device 132). In other embodiments, the analysis tool 108 may be implemented using a separate device, or a collection of computing devices (e.g., configured as a server).

The classification repository 124 is generally a data store, or database, configured to receive and store classified images/videos 126, classified documents 128, and detected objects 130 determined by the analysis tool 108. As described above, the classified images/videos 126 generally may include images/videos 104, which have been classified by the analysis tool 108. For example, a classified image/video 126 may include all or portions of a corresponding image/video 104 along with at least one probability 122*a,b* that the image/video 104 is associated with a given class 120*a,b* (e.g., that the image contains a human, handwritten text, etc.). Similarly, the classified documents 128 may include documents 106 which have been classified by the analysis tool 108. For example, a classified document 128 may include all or a portion of a given document 106 along with at least one probability 122*a,b* that the document 106 is associated with a given class 120*a,b* (e.g., that the document is associated with a given business unit, that the document describes an event which should be flagged for further administrative review, etc.). Identified objects 130 may correspond to particular objects (e.g., people, animals, items, names, words, etc.) detected in an image/video 104 and/or a document 106. The classification repository 124 may be stored in memory of a dedicated device (e.g., or a collection of devices) and/or in a memory of one or both of the analysis tool 108 and the user device 132. The classification repository 124 may be implemented using the processor, memory, and interface of device 600 described with respect to FIG. 6 below.

Figure 2A:
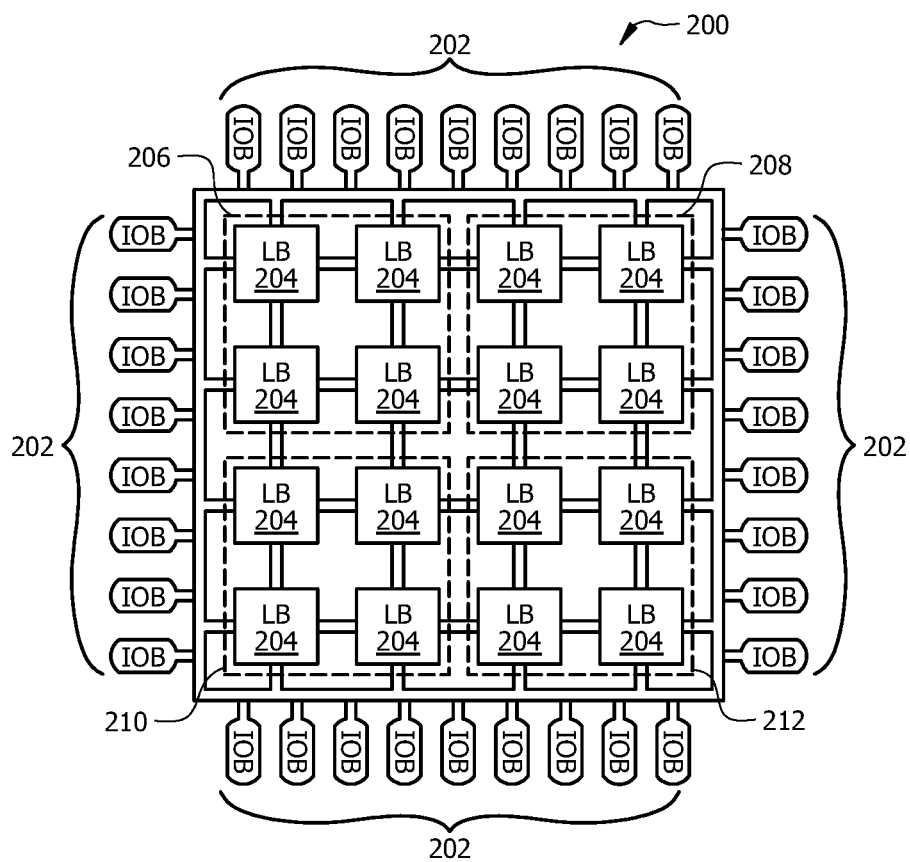
FIG. 2A is a diagram of an example field programmable gate array (FPGA) device for use in the system of FIG. 1.

The user device 132 is generally any computing device operable to receive user input (e.g., associated with selecting information from the sources 102) and communicate with the analysis tool 108. For instance, the user device 132 may include any appropriate interface and input device for searching for information from source(s) 102 and requesting analysis be performed by the analysis tool 108. In some embodiments, the user device 132 is communicatively coupled to the analysis tool 108 (e.g., via network 134). However, in other embodiments, the analysis tool 108 is implemented, at least in part, within the user device 132. For example, the user device 132 may include one or more FPGA devices (e.g., as illustrated in FIG. 2A) configured to implement one or more functions of the analysis tool 108. User device 132 may be implemented using the processor, memory, and interface of device 600 described with respect to FIG. 6 below.

Network 134 facilitates communication between and amongst the various components of the system 100. This disclosure contemplates network 134 being any suitable network operable to facilitate communication between the components of the system 100. Network 134 may include any interconnecting system capable of transmitting audio, video, signals, data, messages, or any combination of the preceding. Network 134 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an example operation of the system 100, the analysis tool 108 extracts an image 104 from a data source 102. For instance, the analysis tool 108 may access an image 104 from the data source 102 via the network 134 and store the image 104. If the image 104 is a color image (e.g., an N×N×3 matrix), the analysis tool 108 may convert the image 104 into an appropriate format (e.g., an N×N matrix) for use as input data 114. The classifier/detector 110 uses this input data 114 to determine classification results 118 for the received image 104. The classification results 118 may be determined using a neural network (e.g., a CNN or RNN) implemented by the classifier/detector 110. For instance, determination of the results 118 may involve determination of feature maps in different layers of the neural network (e.g., feature maps 310, 320 shown in FIG. 3), which may be used to determine at least one probability 120*a,b* that the input data 114 (e.g., and the corresponding image 104) is associated with a predefined class 122*a,b*. In some embodiments, functions of the classifier/detector 110 are implemented using the FPGA device described with respect to FIG. 2A-4 below.

In some cases, the classification results 118 are used to identify an object 130 in the image 104 or document 106. For instance, if the classification results 118 include a probability that is greater than a threshold value that a given object (e.g., a person, a dog, a cat, a particular word or number, etc.) is in the image 104 or document 106, the analysis tool 108 may determine that the object 130 is in the image 104. The image 104 may be stored along with an indication of the associated object 130. As an illustrative example, the identified object 130 may be a face of a person in an image 104. Based on this identified object 130 and/or other features determined from the input data 114, the analysis tool 108 may classify the image 104 as an image containing a person. The image 104 may be stored as a classified image 126 that is associated (e.g., linked or otherwise appropriately linked) with a class 120*a,b* of images containing people. In some cases, the analysis tool 108 may determine that results 118 should be flagged and provided to an appropriate user (e.g., an administrator) such that further appropriate review may be performed. For instance, if an image 104 is classified as being associated with an unapproved activity, the image 104 may be provided for further review. Similarly, if a document 106 is identified as describing an unapproved event, this document may be provided to an appropriate user for further review.

FPGA Device for Data Classification

FIG. 2A illustrates an example FPGA device 200 for implementing the classifier/detector 110 of FIG. 1. The FPGA device 200 is generally a semiconductor device that includes input output blocks (IOBs) 202 and a matrix of configurable logic blocks (LBs) 204 connected via programmable interconnects. The FPGA device 200 can be configured to achieve desired application and/or functionality requirements after it is manufactured. The FPGA device 200 may be a one-time programmable (OTP) FPGA, which cannot be modified once configured. However, in most embodiments, the FPGA is an SRAM-based device which can be reprogrammed (e.g., as a model evolves over time).

The input output blocks 202 provide communication (i.e., providing output or input) with other computing components (e.g., processors, memories, interfaces, and the like). The logical blocks 204 may be assigned different tasks and/or functions related to storing information and/or processing data. For instance, a first set 206 of logical blocks 204 may be configured to act as memory buffer and/or memory channels of the FPGA device 200. The memory buffer and/or channels may store data used by other logical blocks 204. For instance, the set 206 of logical blocks may store input data 114 of FIG. 1 and calculation results determined by other logical blocks 204. The other sets 208, 210, 212 of logical blocks 204 may be configured to perform other processing tasks (e.g., to process data and/or perform calculations). For instance, a first set 208 of logical blocks 204 may be configured to perform functions of a first layer of a neural network (e.g., a CNN or RNN). A second set 210 of logical blocks 204 may be configured to perform functions of a second layer of the neural network. An $n^{th}$ set 212 of the logical blocks 204 may be configured to perform functions of an $n^{th}$ layer of the neural network. An example implementation of such a neural network is described in greater detail below with respect to FIG. 3. While the example FPGA 200 of FIG. 2A shows four sets 206, 208, 210, 212 of logical blocks 204, it should be understood that the logical blocks 204 can be allocated into more or fewer sets 206, 208, 210, 212 of logical blocks 204.

This disclosure encompasses the recognition that certain processes associated with implementing the analysis tool 108 of FIG. 1 can be accomplished more efficiently using the FPGA device 200. As an example, this disclosure encompasses the recognition that the matrix configuration of the array of logical blocks 204 is similar to the matrix structure of kernels used to implement CNN models (see FIG. 3 and corresponding description below). The matrix of logical blocks 204 can thus uniquely be "aligned" to corresponding matrix elements of a kernel such that feature map values can be determined efficiently in parallel in both space and time using the FPGA device 200 with a relatively low memory and power overhead. Moreover, improved efficiency and accuracy can be achieved by replacing the matrix operations (e.g., matrix multiplication), which are normally used in neural networks. Efficient implementation of these logical operations are particularly facilitated by the unique look-up table capabilities of FPGA devices (see FIGS. 2B and 3).

Figure 2B:
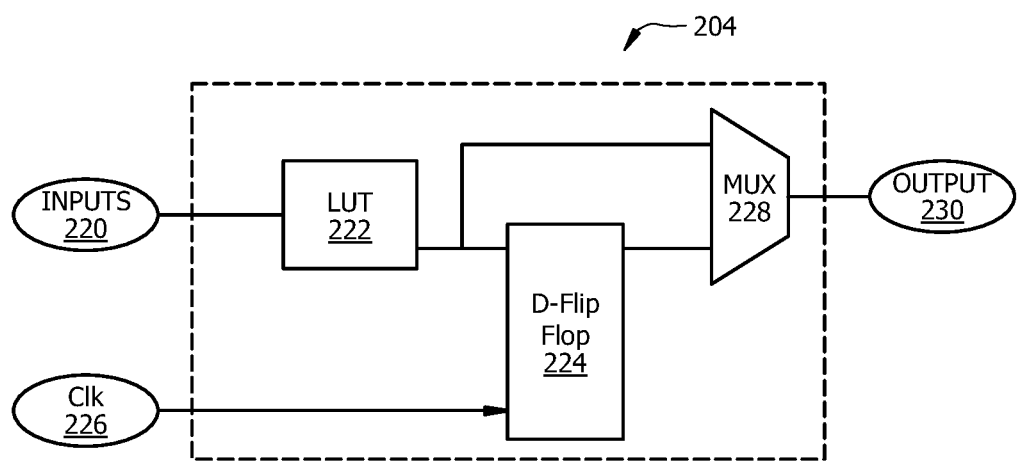
FIG. 2B is a diagram of an example logical block of the FPGA device illustrated in FIG. 2A.

FIG. 2B illustrates an example logical block 204 of FIG. 2A in more detail. The logical block 204 includes a look-up table (LUT) 222, a flip flop 224, and a multiplexer (Mux) 228. The logical block 204 is generally configured to perform a logical operation on inputs 220 (e.g., which may include the input data 114 and weight vector 306, 314, 324 of FIG. 3 described below) and provide corresponding output(s) 230. For example, the look-up table 222 may include one or more custom truth tables with appropriate values for implementing the logical operations performed by the logical block 204 (see FIG. 3 below). As described further below with respect to FIG. 3, the look-up table 222 may include a truth table for implementing an XNOR gate (i.e., XNOR operations). In XNOR operations, or "exclusive nor" operations, the output 230 is true (e.g., a value of one) when all of its inputs 220 are true or when all of its inputs 220 are false. If some inputs 220 are true and others are false, then the output 230 of an XNOR operation is false (e.g., with a value of zero). This disclosure encompasses the recognition that the determination of kernels (e.g., kernels 304, 312, 322 of FIG. 3) used for image classification can be implemented using such logical operations, rather than more computationally expensive matrix multiplication operations (e.g., matrix multiplication). In the context of the analysis tool 108 of FIG. 1 and the example of FIG. 3 described below, the look-up table 222 may include an appropriate truth table for determining, based on inputs 220 (e.g., which includes feature map 302, 310, 320 and a corresponding weight matrix 306, 314, 324 of FIG. 3), an output 230 (e.g., to an appropriate convolutional kernel 304, 312, 322 of FIG. 3 for feature detection/classification). The flip flop 224 acts as a register for storing data, which is updated at intervals based on clock 226. The multiplexer (Mux) 226 acts as a switch for selecting between output of the information from the look-up table 222 or the flip flop 224.

FPGA-Based Implementation of a Neural Network

Figure 3:
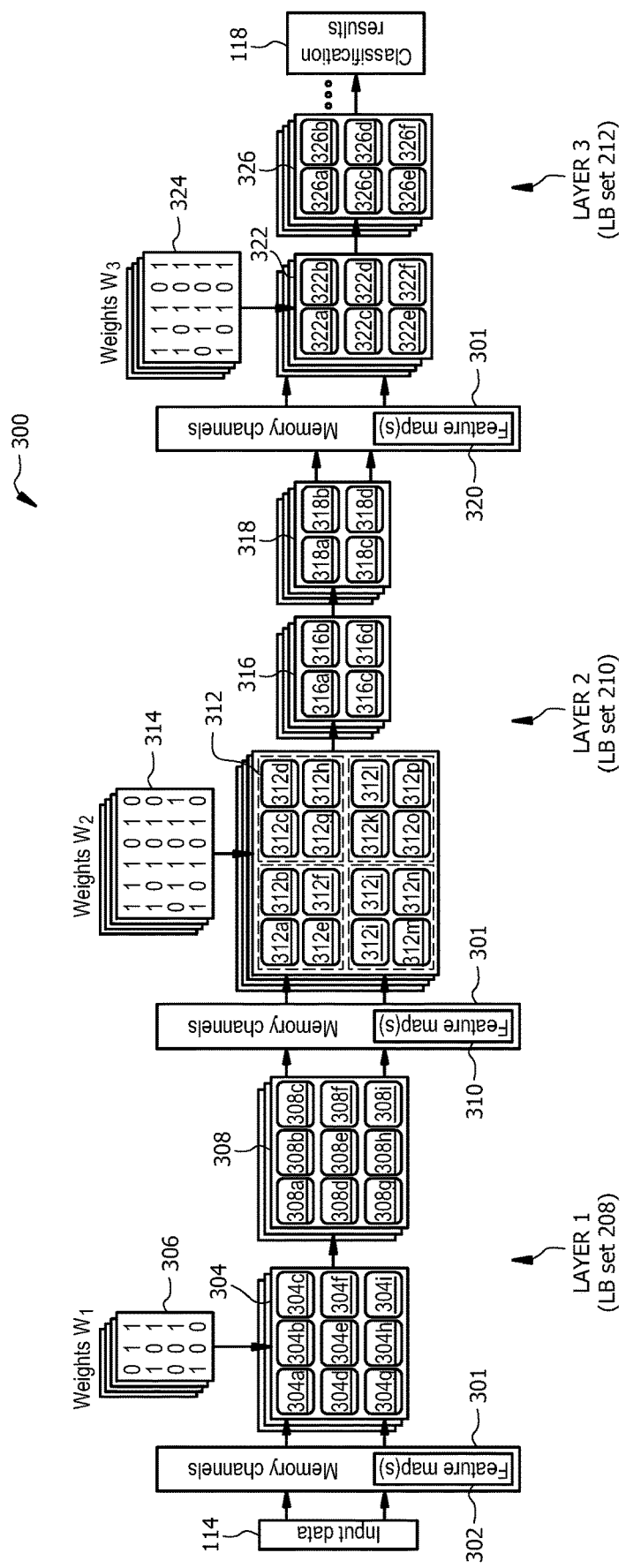
FIG. 3 is a flow diagram illustrating an example implementation of the FPGA device illustrated in FIG. 2A.

FIG. 3 is a flow diagram 300 illustrating an implementation of the classifier/detector 110 of FIG. 1 using the FPGA device 200 of FIG. 2A. In this example, a portion of the implementation of a CNN using the FPGA device 200 of FIG. 2A is illustrated. As shown in FIG. 3, processes are both temporally and spatially parallelized by allocating the different sets 208, 210, 212 of logical blocks 204 (see FIG. 2A) to perform processes associated with the different layers of the CNN. This facilitates efficient and massively parallel processing. In this example, the input data 114 is a N×N×3 image (e.g., a color RGB image). Each layer of the example CNN has at least a convolutional kernel 304, 312, 322 and a corresponding normalized binary kernel 308, 318, 326. Each convolutional kernel 304, 312, 322 is associated with a corresponding array of processing elements 304a-i, 312a-p, 322a-f implemented using the FPGA device 200 of FIG. 2A. The number of processing elements 304a-i, 312a-p, 322a-f for each convolutional kernel 304, 312, 322 generally corresponds to the spatial parallelism factor of the kernel 304, 312, 322. A convolutional kernel 304, 312, 322 with a parallelism factor of P computes P pixel values of the output feature map in parallel.

The normalized binary kernel 308, 318, 326 for a given layer is generally used to "filter" the feature map 302, 310, 320 from the previous layer (e.g., to select for particular features within the input feature map 302, 310, 320) and generate a feature map 310, 320 which is output by the layer. Feature maps 302, 310, 320 may be mapped onto memory channels 301, which may include block memory (e.g., set 206 of logical blocks 204 of FIG. 2A) of the FPGA device 200 and/or random access memory (RAM) of an associated computing device (i.e., the device in which the FPGA device 200 is implemented). In some embodiments, the feature maps 302, 310, 320 are mapped only to the RAM of the associated computing device in order to improve efficiency of processes performed by the FPGA device 200.

In this example, input data 114 is received in the memory channels 301 of the FPGA device 200. The first layer of the CNN model, which is implemented using the first set 208 of logical blocks 204 (see FIG. 2A), receives the feature map 302 and weight vector 306. The weight vector 306 is generally determined via training (e.g., using training data 112) and configured to determine an appropriate convolutional kernel 304 for identifying useful features in the image 114. The weight vector 306 may be stored in logical blocks 204 of the FPGA device 200 from set 206, which are configured for storing information (see FIG. 2A and corresponding description above). Weights 306 may be determined and updated during training of the CNN based on training data 112 of FIG. 1. This first layer of the CNN involves determination of a fixed-point convolutional kernel 304 and of a normalized binary kernel 308 for the feature map 302.

A set of processing elements 302a-i executes an XNOR operation (e.g., based on the truth table stored in the look-up table(s) 222 of the corresponding logical block(s) 204, see FIG. 2B and corresponding description above) of the weight vector 306 and the feature map 302 to determine the fixed-point convolutional kernel 304 for the image 114. As described above, an XNOR operation corresponds to an operation where the output is true (e.g., with a value of one) only when all of inputs are true or when all inputs are false. Each of the processing elements 304a-i is generally implemented using one or more corresponding logical block 204 of the FPGA device 200. In some embodiments, each processing element 304a-i corresponds to an associated logical block 204 of the FPGA device 200 illustrated in FIG. 2A. For example, the weight vector 306 and the feature map 302 may be provided as the input into an array of a two-input XNOR gate (e.g., as implemented in the example logical block 204 of FIG. 2B above). Since this XNOR gate of the logical blocks 204 employs binary value inputs (e.g., rather than floating-point values), the processing elements 302a-i can be efficiently implemented using the look-up table 222 resources of the FPGA device 200 (see FIG. 2B). This facilitates massively parallel computing in the FPGA device 200. In some embodiments, the number of XNOR gates employed by each processing element 302a-i is equivalent to the unfolding factor of the current layer of the CNN. The unfolding factor generally corresponds to the number of subsets the input data (e.g., the feature map 302 is separated into for processing in the first layer).

A normalized binary kernel 308 is determined from the convolutional kernel 304. Each of the normalized binary elements 308a-i may be implemented using a corresponding logical block 204 or set of logical blocks 204 of the FPGA device 200 illustrated in FIG. 2A. The normalized binary kernel 308 generally corresponds to a "normalized" version of the convolutional kernel 304, where values are adjusted to conform to a normal distribution. This facilitates improved detection of local minima and/or maxima in the feature map (e.g., for the detection of edges, etc.). Normalization may also stabilize and accelerate the training process (e.g., such that weights 306 may be optimized for classification and detection more effectively and efficiently).

The normalized binary kernel 308 is used to determine the output feature map(s) 310 of the first layer. The feature map(s) 302 are generally convoluted using the kernel 308 to generate the first-layer feature map(s) 310. For example, each element (e.g., pixel) of the input image 114 may be added to its local neighbors in a region the size of the normalized binary kernel 308 and weighted by the values of the kernel 308. The values of a given element in a determined feature map 310 correspond to the results of this calculation as the kernel 308 is "moved" element-wise along the image 114. This process is referred to as convolution. The resulting feature map(s) 310 thus include at least one matrix with a size that is smaller than the original input image 114 (e.g., because of downscaling during convolution). The output feature map(s) 310 may, for instance, be associated with relatively low-level features (e.g., edges, curves, etc.) provided to the memory channels 301 for temporary storage.

The second layer of the CNN model, which is implemented using the second set 210 of logical blocks 204 (see FIG. 2A), receives the feature map 310 and weight vector 314. The weight vector 314 is generally determined via training (e.g., using training data 112) and configured to determine an appropriate convolutional kernel 312 for identifying useful higher-level features in the feature map(s) 310 and/or the input image 114. The weight vector 314 may be stored in logical blocks 204 of the FPGA device 200 from set 206, which are configured for storing information (see FIG. 2A and corresponding description above). Weights 314 may be determined and updated during training of the CNN based on training data 112 of FIG. 1. This second layer of the CNN involves determination of a binary convolutional kernel 312, a pooled kernel 316, and a normalized binary kernel 308.

Similarly to as described for the first layer, a set of processing elements 312a-p executes an XNOR operation (e.g., based on the truth table stored in the look-up table(s) 222 of the corresponding logical block(s) 204, see FIG. 2B and corresponding description above) of the weight vector 314 and the feature map 310 to determine the binary convolutional kernel 312 for the feature map 310. Each of the processing elements 312a-p is generally implemented using one or more corresponding logical block 204 of the FPGA device 200. In some embodiments, each processing element 312a-p corresponds to an associated logical block 204 of the FPGA device 200 illustrated in FIG. 2A.

A pooled kernel 316 may be determined using a pooling method based on the binary convolutional kernel 312. For instance, max pooling may be used, which involves the selection of maximum values in a pooling region. For example, the value stored in max pooling element 316a may be the maximum value of the values from 312a,b,e,f. The values corresponding to max pooling elements 316b, 316c, and 316d are the maximum values from processing elements 312c,d,g,h, 312i,j,m,n, and 312k,l,o,p, respectively. In other words, subsampling, in this example, is performed across a pooling region (e.g., a 4×4 contiguous region) of the binary kernel 312. Each of the max pooling elements 316a-d is generally implemented using one or more corresponding logical block 204 of the FPGA device 200. In some embodiments, each max pooling element 316a-d corresponds to an associated logical block 204 of the FPGA device 200 illustrated in FIG. 2A. Pooling may retain information which is useful for classification and eliminate other information that is not useful for classification. Pooling may also or alternatively provide rotational invariance (i.e., such that the rotation of the input image 114 does not substantially impact the classification results 118. Pooling may also reduce the number of trainable parameters in the CNN and thereby improve overall accuracy and efficiency. While the example of FIG. 3 is shown as employing max pooling, it should be understood than any other appropriate pooling method may be used. For example, average-pooling, which involves the determination and use of a mean value from the pooling region, may be used.

A normalized kernel 318 is then determined based on the max pooling kernel 316. Normalization may be performed similarly to as described above with respect to the determination of normalized binary kernel 308 of the first layer. Each of the normalized elements 318a-d is generally implemented using one or more corresponding logical block 204 of the FPGA device 200. In some embodiments, each normalized matrix element 318a-d corresponds to an associated logical block 204 of the FPGA device 200 illustrated in FIG. 2A. The normalized binary kernel 318 is used to determine the feature map(s) 320 output by the second layer (e.g., via convolution as described above). The feature map(s) 320 of the second layer may include (or describe) higher-level features associated with the original input image 114 (e.g., features associated with the presence of a person, handwritten text, an arm, a portion of an animal, etc.). The feature map(s) 320 are generally provided to the memory channels 301 for temporary storage and retrieval by the next layer of the CNN.

The third layer of the CNN model, which is implemented using the third set 212 of logical blocks 204 (see FIG. 2A), receives the feature map 320 and weight vector 324. The weight vector 324 is generally determined via training (e.g., using training data 112) and configured to determine an appropriate convolutional kernel 322 for identifying useful higher-level features in the feature map(s) 320 and/or the input image 114. The weight vector 324 may be stored in logical blocks 204 of the FPGA device 200 from set 206, which are configured for storing information (see FIG. 2A and corresponding description above). Weights 324 may be determined and updated during training of the CNN based on training data 112 of FIG. 1. The third layer of the CNN may function similarly to the first layer, as described above. For example, similarly to as described for the first layer, a set of processing elements 322a-f executes an XNOR operation (e.g., based on the truth table stored in the look-up table(s) 222 of the corresponding logical block(s) 204, see FIG. 2B and corresponding description above) of the weight vector 324 and the feature map 320 to determine the binary convolutional kernel 322 for the feature map 320. Each of the processing elements 322a-f is generally implemented using one or more corresponding logical block 204 of the FPGA device 200. In some embodiments, each processing element 322a-f corresponds to an associated logical block 204 of the FPGA device 200 illustrated in FIG. 2A.

A normalized binary kernel 326 is determined from the convolutional kernel 322. Each of the normalized binary elements 326a-f may be implemented using a corresponding logical block 204 or set of logical blocks 204 of the FPGA device 200 illustrated in FIG. 2A. The normalized binary kernel 326 may be used to determine additional feature map(s) for the third layer (e.g., via convolution of feature map(s) 320), and additional layers may be implemented to determine additional feature maps (not shown for clarity and conciseness). For example, the final layer may use established information (e.g., established via the training data 112 of FIG. 1) regarding which features are most strongly correlated to a particular class 120a,b to determine probabilities 122a,b that the input image 114 is associated with each class 120a,b. This information may be provided as classification results 118. As described above, with respect to FIG. 1, the final output 118 of the final layer (e.g., a fully connected layer) of the CNN generally includes at least one probability 122a,b that the input 114 is associated with a predetermined class 120a,b. More generally, the CNN may output a vector of such probabilities 122a,b, where each probability 122a,b represents the likelihood that the image 114 is associated with a particular class 120a,b. For example, if the resulting probability vector for a CNN for classifying whether an image 114 is a dog, cat, or human is [0.1 0.01 0.75], then this represents a 10% probability that the image 114 contains a dog, a 1% probability that the image 114 contains a cat, and a 75% probability that the image 114 contains a human.

Figure 4:
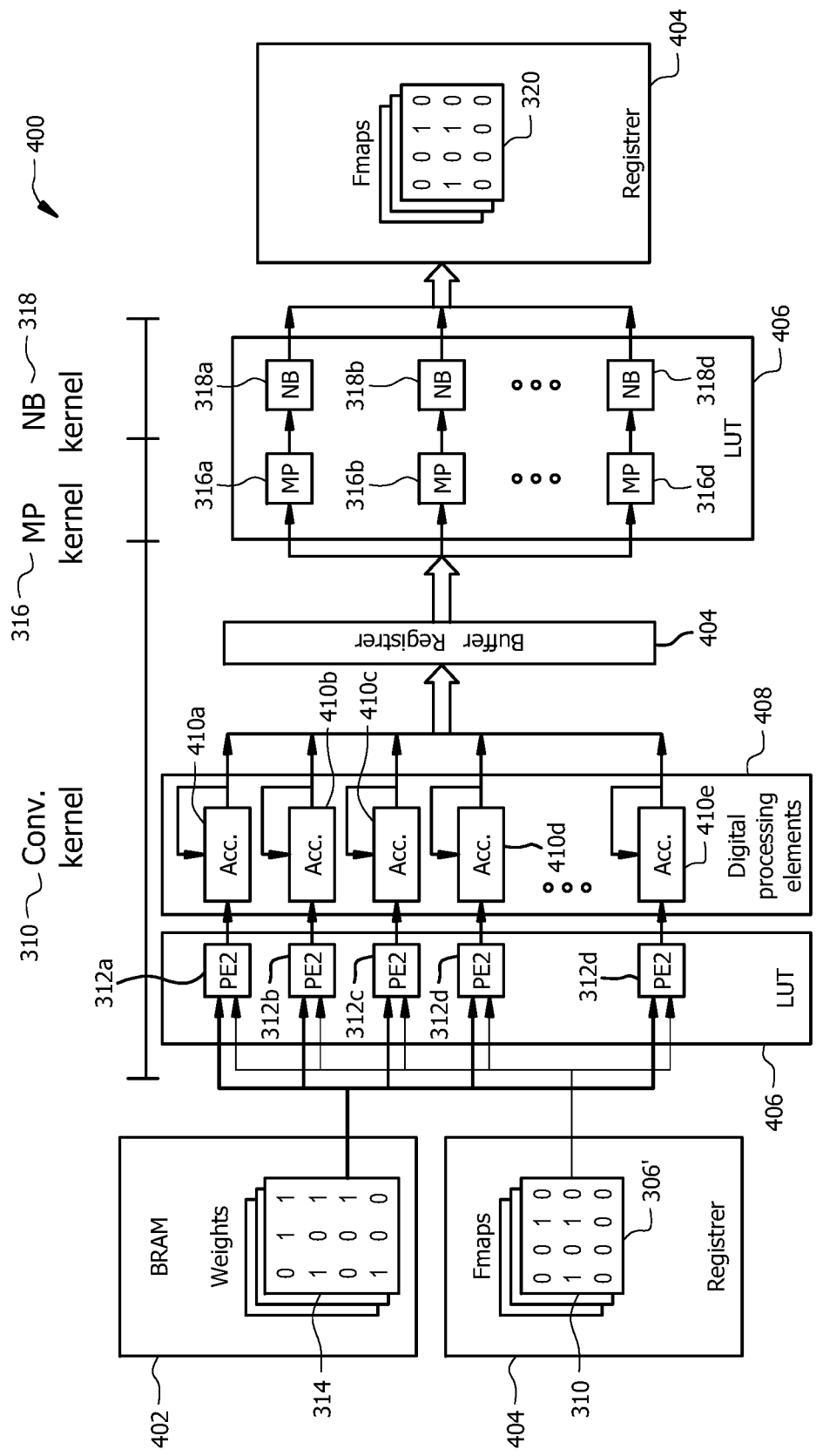
FIG. 4 is a diagram illustrating an example allocation of memory resources in the FPGA device of FIG. 2A.

FIG. 4 is a diagram 400 illustrating memory allocation in the example FPGA device 200 of FIG. 2A for the second layer of the CNN model illustrated in FIG. 3. This example memory allocation provides for the reading and writing of large numbers of bits in the same clock cycle (i.e., for parallel processing). Partitioning the memory as illustrated in FIG. 4 essentially facilitates the "breaking down" of a large data array into smaller arrays which can fit into multiple block memories (BRAMs) for parallel access. For instance, as illustrated in this example, weights 314 and feature map arrays 310 are mapped onto BRAMs 402 and distributed RAMs (registers) 404 (e.g., RAM of a computing device in which the FPGA device 200 is implemented, see FIG. 6), respectively. The processing elements 312a-p associated with the binary convolutional kernel 312 are implemented using look-up table resources 406 (e.g., associated with the look-up tables 222 of FIG. 2B), and corresponding accumulations 410a-p of outputs from these processing elements 312a-p are handled by processing elements 408 of the FPGA device 200. This output may be stored in a buffer register 404 before being processed to determine the pooled kernel 316, normalized binary kernel 318, and subsequent feature maps 320 (see FIG. 3 and corresponding description above).

Implementation of a CNN using an FPGA device like that illustrated in FIG. 2A was found to have an unexpectedly high accuracy and low memory consumption. TABLE 1 below illustrates a comparison of performance metrics for a CNN implemented using a CPUs, GPUs, and the new FPGA devices described in this disclosure. The FPGA-based approach involves only slightly longer training time than the GPU-based approach and has a higher accuracy with a much lower memory consumption. The FPGA-based approach had unexpectedly fast training times and an unexpectedly high accuracy compared to the GPU-based approach.

| Task | Hardware | Training time | Memory Consumption | Accuracy |
| --- | --- | --- | --- | --- |
| Document classification | CPU (16 GB) | 8 hrs-200 epochs | 350 MB | 72.1% |

-continued

| Task | Hardware | Training time | Memory Consumption | Accuracy |
| --- | --- | --- | --- | --- |
| | GPU (4 Core) | 2.5 hrs-350 epochs | 3.9 GB | 93% |
| | FPGA (7 Tops) | 3.25 hrs-350 epochs | 720 MB | 94.5% |

Classification Based on Logical Operations

Figure 5:
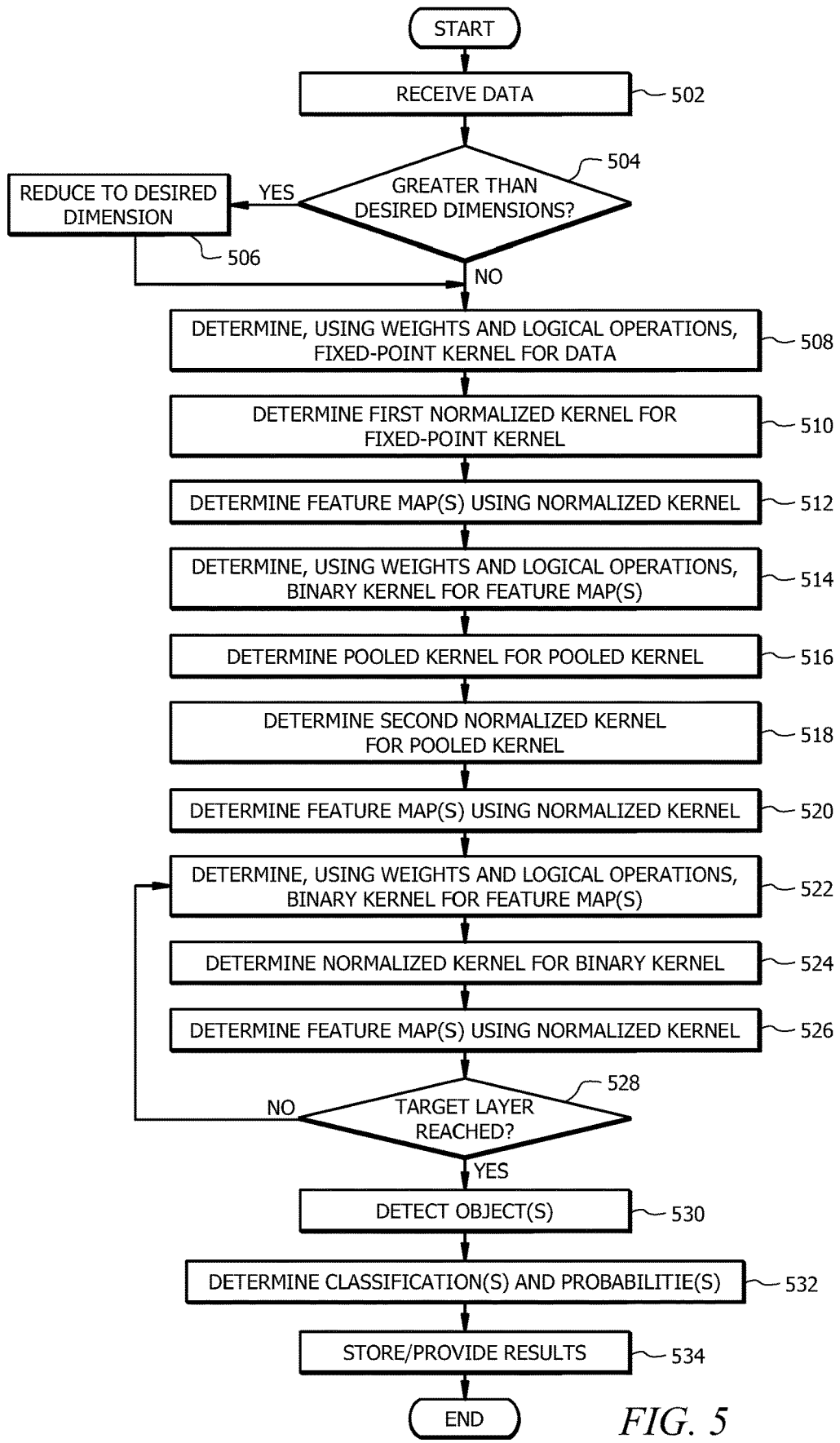
FIG. 5 is a flowchart illustrating operation of the analysis tool of the system of FIG. 1.

FIG. 5 is a flowchart of an example method 500 of classifying input data 114 using the system of FIG. 1. The method 500 generally facilitates the classification of input data 114 (e.g., which may include an image/video data 104 and/or document data 106) to determine useful classification results 118. As described above, this disclosure encompasses the recognition that the determination of kernels (e.g., kernels 304, 312, 322 of FIG. 3) used for image classification can be implemented using logical operations rather than more computationally expensive matrix multiplication operations. Efficiency may be improved, for example, because outputs from different layers of a neural network (e.g., CNN, RNN, etc.) implemented using such logical operations are binary values rather than fixed-point or floating-point values, which involve more memory for storage. Method 500 may begin at step 502 where input data 114 are received by the analysis tool 108. For example, analysis tool 108 may submit a request for a particular image/vide 104 and/or document 106 from a data source 102 and receive the requested data 104, 106 as input data 114.

At step 504, the analysis tool 108 may determine whether the input data 114 has desired (e.g., a predefined number of) dimensions for analysis. For example, input data 114 may be a matrix with greater than a threshold number of entries in a given dimension (e.g., if the input data 114 is an x×y×z matrix, any one of x, y, or z may be greater than a threshold value). For instance, if the input data is an RGB color image (i.e., N×N×3 data), and the analysis tool 108 is configured to review grayscale images (i.e., N×N data), the analysis tool 108 may determine that the input data 114 is greater than the desired dimensions at step 504. As another example, the input data 114 may be a video with a greater number of frames than can be processed within a given timeframe by the analysis tool 108. If the input data 114 is greater than the desired dimensions at step 504, the analysis tool 108 proceeds to step 506 to reduce the dimensions of the input data 114. Otherwise, the analysis tool 108 proceeds to step 508

At step 506, the analysis tool 108 reduces the dimensions of the data 114. Reducing the dimensions at step 506 may involve, for example, averaging RGB values to generate a corresponding grayscale image. For example, the R value, G, value, and B value for a given N×N position may be averaged. If the image included greater than a desired number of pixels in any dimension, the analysis tool 108 may average adjacent pixel values (e.g., to convert an N×N image to an M×M image, where M is less than N). In general, any appropriate approach may be used to convert the input data 114 to an appropriately dimensioned matrix for further analysis in the subsequent steps described below.

At step 508, the analysis tool 108 applies XNOR logical operations to a predefined vector of weights (e.g., weight vector 306 of FIG. 3) and the input data 114 (e.g., whether re-dimensioned at step 506 or not) in order to determine a convolutional kernel (e.g., kernel 304 of FIG. 3). For example, a first layer of a CNN model implemented by the analysis tool 108 may receive the input data 114 along with a predetermined weight vector (e.g., weight vector 306 of FIG. 3). The weight vector is generally determined via training (e.g., using training data 112 of FIG. 1) and configured to determine an appropriate convolutional kernel (e.g., kernel 304 of FIG. 3) for identifying low-level features in the input data 114. Multiple XNOR operations may be performed between values of the input data 114 and the weight vector to determine the first-layer convolutional kernel (e.g., kernel 304 of FIG. 3). As described above, an XNOR operation corresponds to an operation where the output is true (e.g., with a value of one) only when all of inputs are true or when all inputs are false. Outputs of these XNOR operations are accumulated and combined (see, e.g., FIGS. 3 and 4 and the corresponding descriptions above) to generate an appropriately dimensioned first-layer convolutional kernel. These XNOR operations may be executed using the particular FPGA device 200 described above or using any appropriate processor (e.g., as described with respect to FIG. 6 below).

At step 510, the analysis tool 108 determines a normalized binary kernel (e.g., kernel 308 of FIG. 3) based on the convolutional kernel determined at step 508. The normalized binary kernel generally corresponds to a "normalized" version of the convolutional kernel determined at step 510, where values are adjusted to conform to a normal distribution. The analysis tool 108 may use any appropriate method of normalization at step 510 to determine the normalized binary kernel (e.g., kernel 308 of FIG. 3). For instance, the analysis tool 108 may sample values in the convolutional kernel determined at step 508, determine statistical features of these values (e.g., a mean and/or standard deviation), and adjust (i.e., "normalize") the values of the convolutional kernel using the statistical features such that values in the normalized kernel approximately follow a normal distribution. A normal distribution refers to a statistical distribution which is symmetrical around the mean value. Normalization may facilitate improved detection of local minima and/or maxima in subsequently determined feature map(s) (e.g., at step 512 described below), which may improve the detection of low-level features such as edges in curves.

At step 512, the analysis tool 108 determines one or more first-level feature maps (e.g., feature maps 310 of FIG. 3) using the normalized binary kernel determined at step 510. These feature map(s) are generally determined by convolution of the input data 114 (e.g., feature map(s) 302 of FIG. 3) with the binary kernel determined at step 510 (e.g., kernel 308 of FIG. 3). For example, each element of the input data 114 may be added to its local neighbors in a region the size of the normalized binary kernel from step 510 and weighted by the values of this kernel. The values of a given element in the determined feature map correspond to the results of this calculation as the kernel is moved, or "scanned," element-wise along the input data 114. The resulting feature map(s) (e.g., feature map(s) 310 of FIG. 3) include at least one matrix with a size that is smaller than the original input data 114. The first-level feature maps determined at step 512 may be used to identify relatively low level features in the input data 114 (e.g., edges, curves, etc.)

At step 514, the analysis tool 108 applies XNOR logical operations to a predefined vector of weights (e.g., weight vector 314 of FIG. 3) and the feature map(s) from step 512 in order to determine a second-layer convolutional kernel (e.g., kernel 312 of FIG. 3). For example, a second layer of a CNN model implemented by the analysis tool 108 may receive the feature map(s) from step 512 (e.g., and/or the original or re-dimensioned input data 114) along with a predetermined weight vector (e.g., weight vector 314 of FIG. 3). The weight vector is generally determined via training (e.g., using training data 112 of FIG. 1) and configured to determine an appropriate convolutional kernel (e.g., kernel 312 of FIG. 3) for identifying high-level features in the input data 114 (e.g., the presence of particular content such as parts of objects, particular text, etc.). Multiple XNOR operations may be performed between values of the feature map(s) from step 512 (and/or the input data 114) and the weight vector to determine the second-layer convolutional kernel (e.g., kernel 312 of FIG. 3). The outputs of these XNOR operations are accumulated and combined (see, e.g., FIGS. 3 and 4 and the corresponding descriptions above) to generate an appropriately dimensioned second-layer convolutional kernel. These XNOR operations may be executed using the particular FPGA device 200 described above or using any appropriate processor (e.g., as described with respect to FIG. 6 below).

At step 516, the analysis tool 108 determines a pooled kernel (e.g., kernel 316 of FIG. 3) based on the convolutional kernel determined at step 514. For example, the analysis tool 108 may employ a pooling method (e.g., max pooling, average pooling etc.) in a pooling region of the convolutional kernel from step 514 to determine the pooled kernel. For instance, max pooling may be used, which involves the selection of maximum values in the pooling region. The pooled kernel may include a matrix of maximum values from the different pooling regions of the convolutional kernel (see kernel 316 of FIG. 3 and corresponding description above). At step 516, pooling may retain information which is useful for classification and eliminate other information that is not useful for classification. Pooling may also or alternatively provide rotational invariance (i.e., such that the rotation of the matrix of input data 114 does not substantially impact the output results 118).

At step 518, the analysis tool 108 determines a normalized binary kernel (e.g., kernel 318 of FIG. 3) based on the pooled kernel from step 516. Similarly to as described above for step 510, the analysis tool 108 may use any appropriate method of normalization to determine the normalized binary kernel (e.g., kernel 318 of FIG. 3). For instance, the analysis tool 108 may sample values in the pooled kernel determined at step 516, determine statistical features of these values (e.g., a mean and/or standard deviation), and adjust (i.e., "normalize") the values of the pooled kernel based on the statistical features, such that values in the normalized kernel approximately correspond to a normal distribution. Normalization may facilitate improved detection of local minima and/or maxima in subsequently determined feature map(s) (e.g., at step 520 described below) and improve the detection of higher-level features.

At step 520, the analysis tool 108 determines one or more second-layer feature maps (e.g., feature maps 320 of FIG. 3) based on the kernel from step 518. These feature map(s) are generally determined by convolution of the feature maps from step 512 (e.g., feature map(s) 310 of FIG. 3) with the binary kernel determined at step 518 (e.g., kernel 318 of FIG. 3). For example, each element of a feature map from step 512 (and/or corresponding elements of the input data 114) may be added to its local neighbors in a region the size of the normalized binary kernel from step 518 and weighted according to the values of the normalized binary kernel. The values of a given element in the output corresponds to the results of this calculation as the kernel is moved, or "scanned," element-wise along the feature map from step 512 (and/or corresponding elements of the input data 114). The resulting feature map(s) (e.g., feature map(s) 320 of FIG. 3) include at least one matrix with a size that is smaller than the feature map(s) of the previous layer (e.g., because of the regional sampling or filtering performed by the kernel from step 518). The second-level feature maps determined at step 512 may be used to identify relatively high level features in the input data 114 (e.g., the presence of particular objects such as portions of bodies, text, particular words or phrases, etc.).

At steps 522, 524, and 526, the analysis tool 108 may continue to determine a further convolutional kernel (step 522), normalized binary kernel (step 524), and feature map(s) (step 526). The same or similar approaches to those described above for steps 508, 510, and 512 may be used for determining the convolutional kernel at step 522, the normalized binary kernel at step 524, and the feature map(s) at step 526, respectively. The third-level feature map(s) determined at step 526 may provide information about higher level features of the input data 114 which may be useful for classification and/or object detection.

At step 528, the analysis tool 108 determines whether the target level of layers have been reached for the model. If the model is configured to include further layers, the analysis tool may return to step 522, and additional feature map(s) may be determined. Otherwise, if the predetermined number of layers has been reached, the analysis tool 108 proceeds to step 530. At step 530, the analysis tool 108 may use the feature map(s) from steps 512, 520, and/or 526 to detect objects 130 associated with the input data 114. For example, the analysis tool 108 may detect a particular object 130 (e.g., a person, handwriting, a particular word or phrase, etc.) in an image/video 104 and/or document 106 included in the input data 114. For example, feature maps determined at one or more of steps 512, 520, and 526 may be compared to predetermined feature maps which are associated with known classes 120a,b of images 104 and/or documents 106. An extent to which each of the determined feature maps is similar to a given predetermined feature maps (e.g., a similarity score) may be used to determine a probability 122a,b that the input data 114 is associated with the known class 120a,b of the predetermined feature map. Similarity scores determined from features at different levels of the CNN may be weighted to determine an overall probability 122a,b for each class 120a,b. At step 532, the analysis tool 108 may classify the input data 114 (e.g., according to whether certain object(s) 130 are detected in the data 114) into an appropriate class 120a,b. For instance, as described above with respect to FIGS. 1 and 3, the probabilities 122a,b may be determined that the input data 114 is associated with any number of predefined classes 120a,b. At step 534, the detected object 130, the classified image/vide 126, and/or the classified document 128 may be stored in the classification repository 124 and/or provided for display on the user device 132.

Example Computing Device

Figure 6:
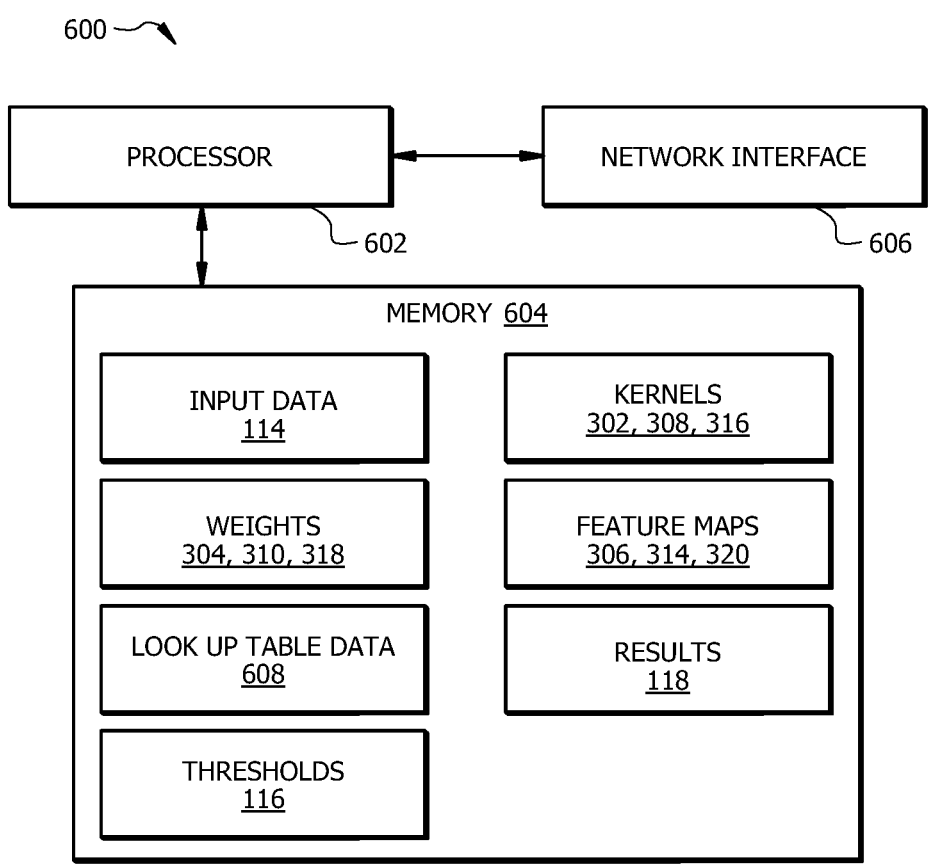
FIG. 6 is a diagram of an example device configured to implement the system of FIG. 1.

FIG. 6 is an embodiment of a device 600 configured to implement the query generation system 100. The device 600 comprises a processor 602, a memory 604, and a network interface 606. The device 600 may be configured as shown or in any other suitable configuration. The device 600 may be and/or may be used to implement source(s) 102, analysis tool 108, classification repository 124, and user device 132 of FIG. 1.

The processor 602 comprises one or more processors operably coupled to the memory 604. The processor 602 is any electronic circuitry including, but not limited to, state machines, one or more central processing unit (CPU) chips, logic units, cores (e.g. a multi-core processor), FPGAs (e.g., as described with respect to FIG. 2A above), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 604 and the network interface 606. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of methods 400 and 600. In an embodiment, the function described herein is implemented using logic units, FPGAs, ASICs, DSPs, or any other suitable hardware or electronic circuitry.

The memory 604 is operable to store input data 114, weights 306, 314, 324, kernels 304, 308, 312, 316, 318, 322, 326, feature maps 302, 310, 320, thresholds 116, classification results 118, and look-up table data 608, and any other data, instructions, logic, rules, or code operable to execute the function described herein. The look-up table data 608 generally includes information stored in truth tables (e.g., for implemented the XNOR operations described above with respect to FIGS. 2B, 3, and 5). The memory 604 comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise read-only memory (ROM), random-access memory (RAM), ternary content-addressable memory (TCAM), dynamic random-access memory (DRAM), and static random-access memory (SRAM).

The network interface 606 is configured to enable wired and/or wireless communications (e.g., over network 134 of FIG. 1). The network interface 606 is configured to communicate data between the device 600 and other network devices, systems, or domain(s). For example, the network interface 606 may comprise a WIFI interface, a local area network (LAN) interface, a wide area network (WAN) interface, a modem, a switch, or a router. The processor 602 is configured to send and receive data using the network interface 606. The network interface 606 may be configured to use any suitable type of communication protocol.

While examples presented in this disclosure primarily describe the implementation of a CNN by the analysis tool 108 of FIG. 1, it should be understood that the classifier/detector 110 may implement any appropriate type of neural network or other machine learning model. For instance, a recurrent neural network (RNN) may be implemented for document 106 analysis.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
    an image source configured to store an image and provide access to the image via a network;
    an analysis tool comprising:
        a memory configured to store:
            a first weight vector configured to determine a first convolutional kernel based on a first layer input;
            a second weight vector configured to determine a second convolutional kernel based on a second layer input; and
            look-up tables, each look-up table comprising information for implementing exclusive nor operations between two inputs; and
        a processor communicatively coupled to the memory and configured to:
            receive, via the network, the image as an input matrix, wherein each element of the input matrix corresponds to a value of a portion of the image;
            determine the first convolutional kernel by performing exclusive nor operations, implemented using at least a portion of the look-up tables, between the input matrix and the first weight vector;
            determine, based on the first convolutional kernel, a first binary kernel, the first binary kernel comprising a matrix of the same size as the first convolutional kernel with values adjusted to conform to a normal distribution;
            determine a first layer feature map by convoluting the input matrix using the first binary kernel;
            determine a second convolutional kernel by performing exclusive nor operations, implemented using at least a portion of the look-up tables, between the first layer feature map and the second weight vector;
            determine, based on the second convolutional kernel, a pooled kernel, the pooled kernel comprising, for each element of the pooled kernel, a representative value associated with a corresponding pooling region of the second convolutional kernel;
            determine, based on the pooled kernel, a second binary kernel, the second binary kernel comprising a matrix of the same size as the pooled kernel with values adjusted to conform to the normal distribution;
            determine a second layer feature map by convoluting the first layer feature map using the second binary kernel;
            determine, based at least in part on the second layer feature map, a probability that the input matrix is associated with a predetermined class of images; and
            in response to determining that the probability is greater than a threshold value, provide classification results to a classification repository, the classification results indicating the image is associated with the class of images; and
    the classification repository configured to receive and store the classification results.

2. The system of claim 1, the memory further comprising a third weight vector configured to determine a third convolutional kernel based on a third layer input; and
    the processor further configured to:
        determine the third convolutional kernel by performing exclusive nor operations, implemented using at least a portion of the look-up tables, between the second layer feature map and the third weight vector;
        determine based on the third convolutional kernel, a third binary matrix, the third binary matrix comprising a matrix of the same size as the third convolutional kernel with values adjusted to conform to a normal distribution; and
        determine a third layer feature map by convoluting the second layer feature map using the third binary matrix.

3. The system of claim 1, wherein the input matrix is a three-dimensional matrix corresponding to a red-green-blue (RGB) image; and
    the processor further configured to:
        determine a corresponding two-dimensional matrix for the three-dimensional matrix by determining an average value of a red value, green value, and blue value for each element; and
        use the two-dimensional matrix as the input matrix.

4. The system of claim 1, the processor further configured to determine, the pooled kernel by:
    determining for each pooling region a maximum value, wherein the pooling region corresponds to a 4×4 contiguous region of the second convolutional kernel; and
    generating the pooled kernel using the maximum value for each pooling region.

5. The system of claim 1, the processor further configured to determine a first binary matrix by:
    sampling an initial distribution of values of the first convolutional kernel;
    determining a mean of the samples distribution of values; and
    determining adjusted values for each element of the first convolutional kernel, such that the adjusted values correspond to a normal distribution with the adjusted values symmetrically distributed around the determined mean; and
    generating the first binary matrix using the adjusted values.

6. The system of claim 1, the processor further configured to determine the probability that the input matrix is associated with the predetermined class of images by:
    comparing the second layer feature map to a set of predetermined feature maps associated with the predetermined class of images; and
    determining, based on the comparison of the second layer feature map to the set of predetermined feature maps associated with the predetermined class of images, the probability that the input matrix is associated with the predetermined class of images.

7. The system of claim 1, the processor further configured to determine the first and second weight vectors based on training data, the training data comprising a plurality of images known to be associated with the class of images.

8. A method comprising:
establishing look-up tables, each look-up table comprising information for implementing exclusive nor operations between two inputs;
receiving an input matrix, wherein each element of the input matrix corresponds to a value of a portion of an image;
determining a first convolutional kernel by performing exclusive nor operations, implemented using at least a portion of the look-up tables, between the input matrix and a first weight vector;
determining, based on the first convolutional kernel, a first binary kernel, the first binary kernel comprising a matrix of the same size as the first convolutional kernel with values adjusted to conform to a normal distribution;
determining a first layer feature map by convoluting the input matrix using the first binary kernel;
determining a second convolutional kernel by performing exclusive nor operations, implemented using at least a portion of the look-up tables, on the first layer feature map and a second weight vector;
determining, based on the second convolutional kernel, a pooled kernel, the pooled kernel comprising, for each element of the pooled kernel, a representative value associated with a corresponding pooling region of the second convolutional kernel;
determining, based on the pooled kernel, a second binary kernel, the second binary kernel comprising a matrix of the same size as the pooled kernel with values adjusted to conform to the normal distribution;
determining a second layer feature map by convoluting the first layer feature map using the second binary kernel;
determining, based at least in part on the second layer feature map, a probability that the input matrix is associated with a predetermined class of images; and
in response to determining that the probability is greater than a threshold value, providing classification results indicating the image is associated with the class of images.

9. The method of claim 8, further comprising:
determining a third convolutional kernel by performing exclusive nor operations, implemented using at least a portion of the look-up tables, between the second layer feature map and a third weight vector;
determining based on the third convolutional kernel, a third binary matrix, the third binary matrix comprising a matrix of the same size as the third convolutional kernel with values adjusted to conform to a normal distribution; and
determining a third layer feature map by convoluting the second layer feature map using the third binary matrix.

10. The method of claim 8, wherein the input matrix is a three-dimensional matrix corresponding to a red-green-blue (RGB) image;
the method further comprising:
determining a corresponding two-dimensional matrix for the three-dimensional matrix by determining an average value of a red value, green value, and blue value for each element; and
using the two-dimensional matrix as the input matrix.

11. The method of claim 8, further comprising determining, the pooled kernel by:
determining for each pooling region a maximum value, wherein the pooling region corresponds to a 4×4 contiguous region of the second convolutional kernel; and
generating the pooled kernel using the maximum value for each pooling region.

12. The method of claim 8, further comprising determining a first binary matrix by:
sampling an initial distribution of values of the first convolutional kernel;
determining a mean of the samples distribution of values; and
determining adjusted values for each element of the first convolutional kernel, such that the adjusted values correspond to a normal distribution with the adjusted values symmetrically distributed around the determined mean; and
generating the first binary matrix using the adjusted values.

13. The method of claim 8, further comprising determining the probability that the input matrix is associated with the predetermined class of images by:
comparing the second layer feature map to a set of predetermined feature maps associated with the predetermined class of images; and
determining, based on the comparison of the second layer feature map to the set of predetermined feature maps associated with the predetermined class of images, the probability that the input matrix is associated with the predetermined class of images.

14. The method of claim 8, further comprising determining the first and second weight vectors based on training data, the training data comprising a plurality of images known to be associated with the class of images.

15. A device comprising:
a memory configured to store:
an input matrix, wherein each element of the input matrix corresponds to a value of a portion of an image;
a first weight vector configured to determine a first convolutional kernel based on a first layer input;
a second weight vector configured to determine a second convolutional kernel based on a second layer input; and
look-up tables, each look-up table comprising information for implementing exclusive nor operations between two inputs; and
a processor communicatively coupled to the memory and configured to:
determine the first convolutional kernel by performing exclusive nor operations, implemented using at least a portion of the look-up tables, between the input matrix and the first weight vector;
determine, based on the first convolutional kernel, a first binary kernel, the first binary kernel comprising a matrix of the same size as the first convolutional kernel with values adjusted to conform to a normal distribution;
determine a first layer feature map by convoluting the input matrix using the first binary kernel;
determine a second convolutional kernel by performing exclusive nor operations, implemented using at least a portion of the look-up tables, between the first layer feature map and the second weight vector;

determine, based on the second convolutional kernel, a pooled kernel, the pooled kernel comprising, for each element of the pooled kernel, a representative value associated with a corresponding pooling region of the second convolutional kernel;

determine, based on the pooled kernel, a second binary kernel, the second binary kernel comprising a matrix of the same size as the pooled kernel with values adjusted to conform to the normal distribution;

determine a second layer feature map by convoluting the first layer feature map using the second binary kernel;

determine, based at least in part on the second layer feature map, a probability that the input matrix is associated with a predetermined class of images; and in response to determining that the probability is greater than a threshold value, provide classification results indicating the image is associated with the class of images.

16. The device of claim 15, the memory further comprising a third weight vector configured to determine a third convolutional kernel based on a third layer input; and the processor further configured to:

determine the third convolutional kernel by performing exclusive nor operations, implemented using at least a portion of the look-up tables, between the second layer feature map and the third weight vector;

determine based on the third convolutional kernel, a third binary matrix, the third binary matrix comprising a matrix of the same size as the third convolutional kernel with values adjusted to conform to a normal distribution; and determine a third layer feature map by convoluting the second layer feature map using the third binary matrix.

17. The device of claim 15, wherein the input matrix is a three-dimensional matrix corresponding to a red-green-blue (RGB) image; and the processor further configured to:

determine a corresponding two-dimensional matrix for the three-dimensional matrix by determining an average value of a red value, green value, and blue value for each element; and use the two-dimensional matrix as the input matrix.

18. The device of claim 15, the processor further configured to determine, the pooled kernel by:

determining for each pooling region a maximum value, wherein the pooling region corresponds to a 4×4 contiguous region of the second convolutional kernel; and generating the pooled kernel using the maximum value for each pooling region.

19. The device of claim 15, the processor further configured to determine a first binary matrix by:

sampling an initial distribution of values of the first convolutional kernel;

determining a mean of the samples distribution of values; and determining adjusted values for each element of the first convolutional kernel, such that the adjusted values correspond to a normal distribution with the adjusted values symmetrically distributed around the determined mean; and generating the first binary matrix using the adjusted values.

20. The device of claim 15, the processor further configured to determine the probability that the input matrix is associated with the predetermined class of images by:

comparing the second layer feature map to a set of predetermined feature maps associated with the predetermined class of images; and determining, based on the comparison of the second layer feature map to the set of predetermined feature maps associated with the predetermined class of images, the probability that the input matrix is associated with the predetermined class of images.

* * * * *